United States Patent
Wang et al.

(10) Patent No.: US 10,529,974 B2
(45) Date of Patent: Jan. 7, 2020

(54) SECONDARY BATTERY

(71) Applicant: Contemporary Amperex Technology Co., Limited, Ningde, Fujian (CN)

(72) Inventors: Zhiyu Wang, Ningde (CN); Baisong Chen, Ningde (CN); Peng Wang, Ningde (CN); Rulai Cai, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 275 days.

(21) Appl. No.: 15/657,739

(22) Filed: Jul. 24, 2017

(65) Prior Publication Data

US 2018/0166675 A1    Jun. 14, 2018

(30) Foreign Application Priority Data

Dec. 9, 2016   (CN) .......................... 2016 1 1131606

(51) Int. Cl.
*H01M 2/34*   (2006.01)

(52) U.S. Cl.
CPC ........ *H01M 2/345* (2013.01); *H01M 2200/20* (2013.01)

(58) Field of Classification Search
CPC combination set(s) only.
See application file for complete search history.

(56) References Cited

U.S. PATENT DOCUMENTS

2015/0132619 A1* 5/2015 He .................. H01M 2/043
429/53
2016/0204397 A1   7/2016 Cai et al.

FOREIGN PATENT DOCUMENTS

| CN | 205657138 U | 10/2016 |
|---|---|---|
| EP | 2642561 A1 | 9/2013 |
| WO | 2008002487 A2 | 1/2008 |

OTHER PUBLICATIONS

English Machine translation of CN 205657138. Gong et al. China. Oct. 19, 2016 (Year: 2016).*
Extended European Search Report of European Patent Application No. 17179084.3, dated Aug. 28, 2017, 7 pages.

* cited by examiner

*Primary Examiner* — Christopher P Domone
(74) *Attorney, Agent, or Firm* — Law Offices of Liaoteng Wang

(57) ABSTRACT

The present application provides a secondary battery including a first terminal component, a second terminal component, a cap plate, an electrode component and a resistance element. One of the first and second terminal components is electrically connected to the cap plate through the resistance element, while the other is insulated from the cap plate. The first terminal component includes a connecting plate and a turnable plate, and the connecting plate is attached to the turnable plate. When the secondary battery is in a normal state, a first electrode plate is electrically connected to the connecting plate through the turnable plate, and the second electrode plate is electrically connected to the second terminal component. When a pressure inside the secondary battery exceeds a reference pressure, the turnable plate can turn over to cut off an electrical connection between the turnable plate and the first electrode plate.

11 Claims, 5 Drawing Sheets

SECONDARY BATTERY

CROSS-REFERENCE TO RELATED APPLICATION

This application is based on and claims priority to Chinese Patent Application No. 201611131606.4 filed on Dec. 9, 2016, which is incorporated herein by reference in its entirety.

TECHNICAL FIELD

The present application relates to the technical field of production of an energy storage device, and more particularly to a secondary battery.

BACKGROUND

For an EV (Electric Vehicle) hardshell battery, in order to avoid overcharging, a solution widely adopted in the related industry is to cut off a main circuit of the battery before failure of a battery cell to prevent the battery from being charged continuously and thus ensure the battery's safety. A conventional configuration is as follows: a current cut-off structure is provided in the main circuit connecting a first terminal and an electrode component, and a second terminal is always insulated from the current cut-off structure; when the battery is being overcharged, gas is produced inside the battery, and if the internal pressure is increased to a certain value, the current cut-off structure will be activated to cut off the connection between the first terminal and the electrode component and prevent the battery from being charged continuously. However, when the battery is under a nail penetration test, namely, when a metal nail penetrates a case or a cap plate of the battery, the penetration position will be severely heated and even spark, which may make the battery out of control and cause fire or explosion.

In the current cut-off structure, a turnable plate is attached to a connecting plate, but the turnable plate is electrically connected to the cap plate directly. Extra resistance elements cannot be added on the cap plate of the battery having such a current cut-off structure. Thus, the battery may not pass the nail penetration test.

SUMMARY

The present application provides a secondary battery.

The present application provides a secondary battery, including a first terminal component, a second terminal component, a cap plate, an electrode component and a resistance element, wherein the electrode component includes a first electrode plate, a second electrode plate and a separator between the first and second electrode plates; one of the first and the second electrode plates is electrically connected to the cap plate through the resistance element, and the other is electrically insulated from the cap plate; the first terminal component includes a connecting plate and a turnable plate, wherein the turnable plate is attached to the connecting plate; when the secondary battery is in a normal state, the first electrode plate is electrically connected to the connecting plate through the turnable plate, and the second electrode plate is electrically connected to the second terminal component; when a pressure inside the secondary battery exceeds a reference pressure, the turnable plate can turn over to cut off an electrical connection between the turnable plate and the first electrode plate.

It is to be understood that both the foregoing general description and the following detailed description are only exemplary, and are not intended to limit the present application.

REFERENCE LABELS IN THE DRAWINGS

Figure 1:
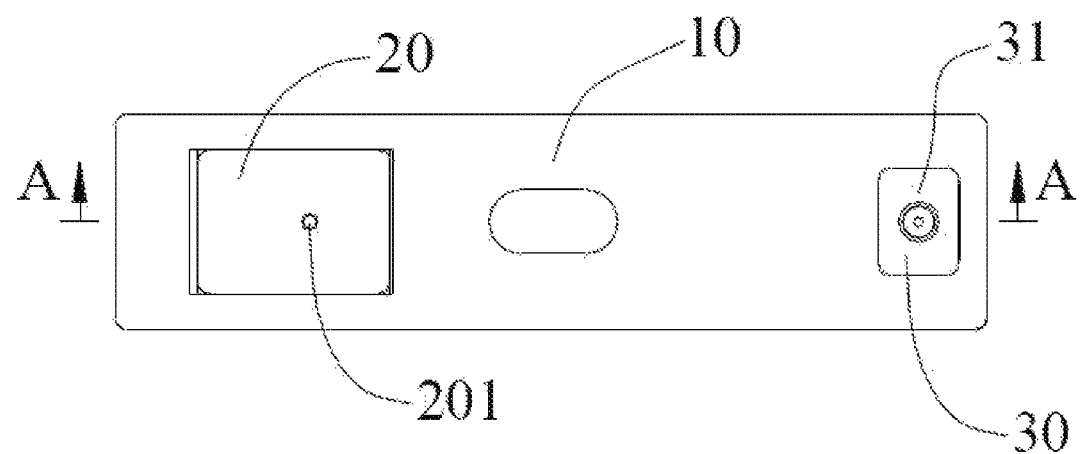
FIG. 1 is a structural schematic diagram for an embodiment of a secondary battery provided in the present application.
Figure 2:
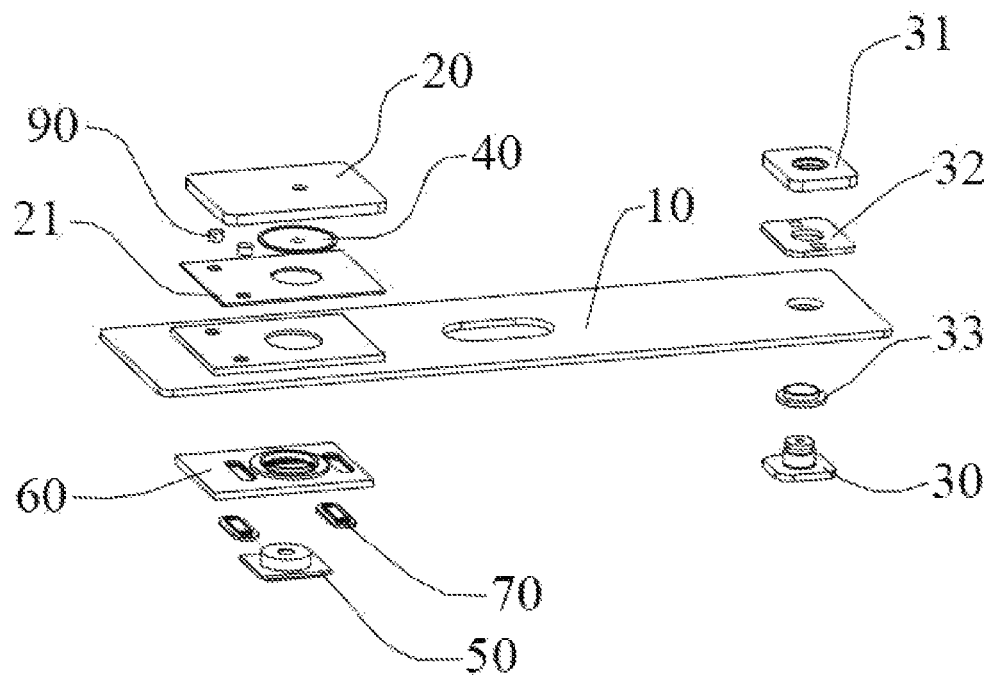
FIG. 2 is an exploded view of an embodiment of the secondary battery provided in the present application.

10—cap plate;
20—connecting plate;
  201—exhaust vent;
  202—recess;
21—first member;
22—first sealing element;
30—second terminal component;
31—conductive block;
32—third member;
33—second sealing element;
40—turnable plate;
  401—turnable portion;
  402—protrusion;
  403—connecting portion;
50—conductive plate;
  501—first conductive portion;
  502—thinning area;
  503—second conductive portion;
  504—first air vent;
  505—second air vent;
60—second member;
70—fixation element;
  701—fixation portion;
  702—locking portion;
90—resistance element.

The drawings, which are incorporated as a part of the specification, illustrate embodiments of the present application, and serve to explain the principles of the present application together with the description.

DETAILED DESCRIPTION

The present application will be further described in detail below by way of specific embodiments and in conjunction with the accompanying drawings.

As shown in FIGS. 1-10, an embodiment of the present application provide a secondary battery, including a first terminal component, a second terminal component 30, a cap plate 10, an electrode component (not shown), and a resistance element 90. The secondary battery further includes a case (not shown) bonding with the cap plate 10. The electrode component includes a first electrode plate, a second electrode plate and a separator between the first and the second electrode plates.

The cap plate 10 seals the case to form an accommodation space. One of the first terminal component and the second terminal component 30 is electrically connected to the cap plate 10 through the resistance element 90, while the other is insulated from the cap plate 10. In particular, the first terminal component includes a connecting plate 20 and a turnable plate 40 attached to the connecting plate 20. When the secondary battery is in a normal state, the first electrode plate is electrically connected to the connecting plate 20 through the turnable plate 40, and the second electrode plate is electrically connected to the second terminal component 30. When a pressure inside the secondary battery exceeds a reference pressure, the turnable plate 40 can turn to cut off the electrical connection between the turnable plate 40 and the first electrode plate, and thus cut off the electrical connection between the connecting plate 20 and the first electrode plate. The first electrode plate may be a positive plate, and accordingly the second electrode plate may be a negative plate; alternatively, the first electrode plate may be a negative plate, and the second electrode plate may be a positive plate. The following description will be provided supposing that the first electrode plate is a positive plate (the first terminal component is a positive terminal) and the second electrode plate is a negative plate (the second terminal component is a negative terminal).

The secondary battery in the above embodiment can solve the overcharge problem. In addition, since the resistance element 90 is added, one of the first terminal component and the second terminal component 30 is electrically connected to the cap plate 10 through the resistance element 90. When the battery is under a nail penetration test, due to existence of the resistance element 90 in an external loop including one of the first terminal component and the second terminal component 30, the resistance element 90, the cap plate 10, the nail, the first and the second electrode plates, the current in the external loop can be decreased. Then the generated heat around the nail can be reduced to prevent battery ignition and keep the battery cell under control. Moreover, by attaching the turnable plate 40 to the connecting plate 20, the overall height of the first terminal component, the second terminal component 30 and the cap plate can be decreased to leave more accommodation space for the electrode component and thus increase energy density of the secondary battery.

In order to further decrease the loop current during the nail penetration, the resistance of the resistance element 90 is normally selected from the range of 1~100000 Ohm ($\Omega$) such as 1$\Omega$, 50$\Omega$, 100$\Omega$, 10000$\Omega$, 80000$\Omega$, 100000$\Omega$, etc. The resistance may be also selected as 0.9$\Omega$, 110000$\Omega$ and the like, depending on requirements of resistance in the loop.

Figure 10:
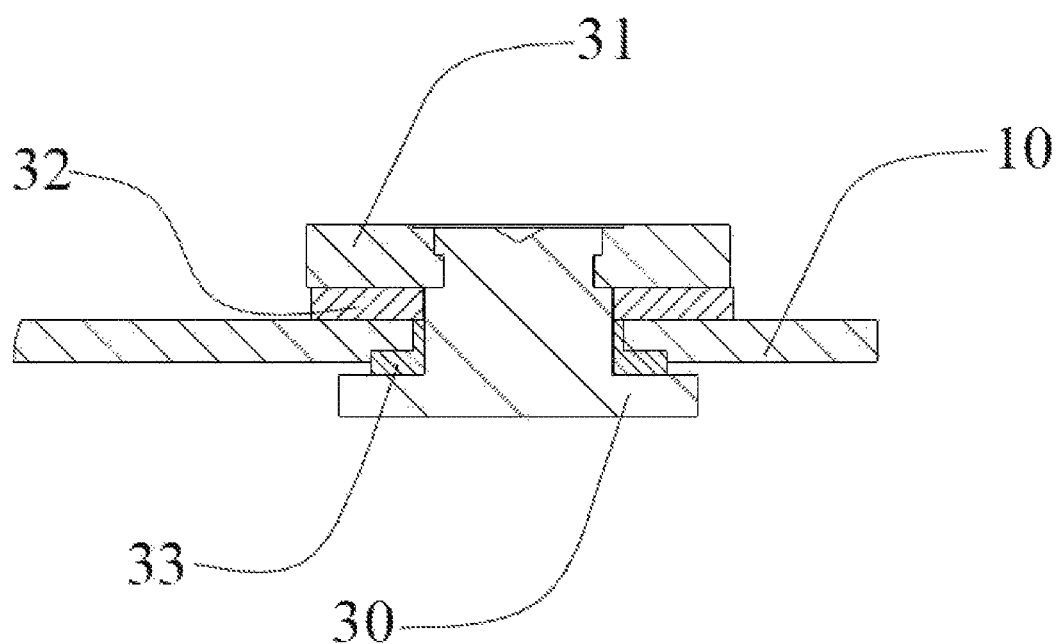
FIG. 10 is yet another partial view for an embodiment of the secondary battery provided in the present application.
Figure 11:
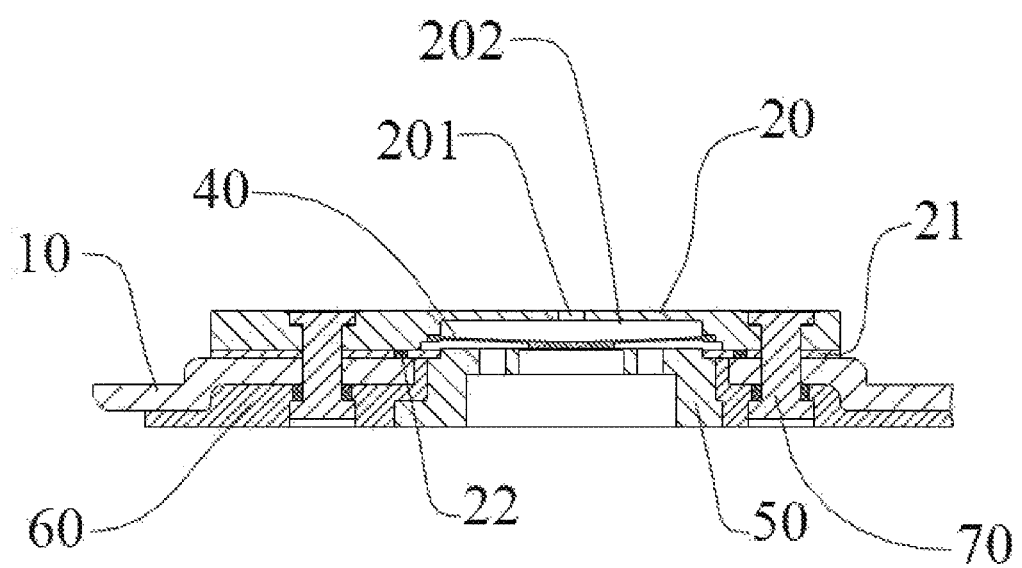
FIG. 11 is still another partial view for an embodiment of the secondary battery provided in the present application.

Generally, the connecting plate 20 and the second terminal component 30 are respectively mounted on the cap plate 10. In order to facilitate the electrical connection of the secondary battery to outside, the connecting plate 20 and the second terminal component 30 may both extend out of the cap plate 10. When the first terminal component is insulated from the cap plate 10, the connecting plate 20 is insulated from the cap plate 10, the connecting plate 20 is provided above the cap plate 10, and the first member 21 is provided between the connecting plate 20 and the cap plate 10 as an insulating element. When the second terminal component 30 is insulated from the cap plate 10, as shown in FIG. 10, the second terminal component 30 extends out of the cap plate 10. In order to ensure the seal between the second terminal component 30 and the cap plate 10, the seal is typically implemented by a sealing element or sealant. The second terminal component 30 can be sealed with the cap plate 10 via a second sealing element 33, which may be a seal ring, a seal gasket, etc. Similarly, a sealing element or sealant (e.g. a first sealing element 22 as shown in FIG. 11) may also be used to ensure the seal between the connecting plate 20 and the cap plate 10. One of the first and second terminal components may be insulated from the cap plate 10 through an insulating structure, insulating cement or insulating varnish. The insulating structure may be a third member 32 as shown in FIG. 10. In this case, the third member 32 is an insulating element, and the second terminal component 30 is insulated from the cap plate 10 through the third member 32.

Typically, in order to facilitate the electrical connection of the second terminal component 30 to outside and fix the second terminal component 30, the secondary battery may further include a conductive block 31. The conductive block 31 is in electrical contact with the second terminal component 30, and the second terminal component 30 is electrically connected to outside through the conductive block 31.

Figure 3:
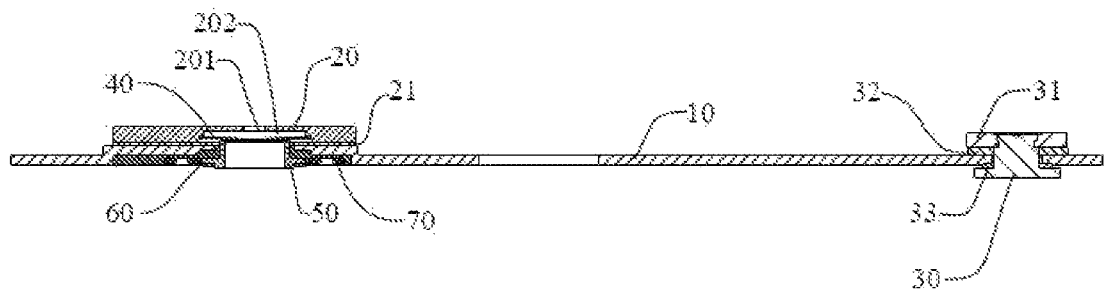
FIG. 3 is a sectional view along A-A line in FIG. 1.

In a first embodiment, both the turnable plate 40 and the resistance element 90 are provided on a same terminal. That is, the first terminal component is electrically connected to the cap plate 10 through the resistance element 90, and the second terminal component 30 is insulated from the cap plate 10, as shown in FIG. 3.

In particular, the cap plate 10 is provided with a first through hole aligned with the turnable plate 40. The seal between the connecting plate 20 and the cap plate 10 or between the turnable plate 40 and the cap plate 10 may be made at the periphery of the first through hole. Optionally, a first sealing element 22 is provided between the connecting plate 20 and the cap plate 10. As shown in FIG. 11, the first sealing element 22 is provided along the periphery of the first through hole.

Figure 4:
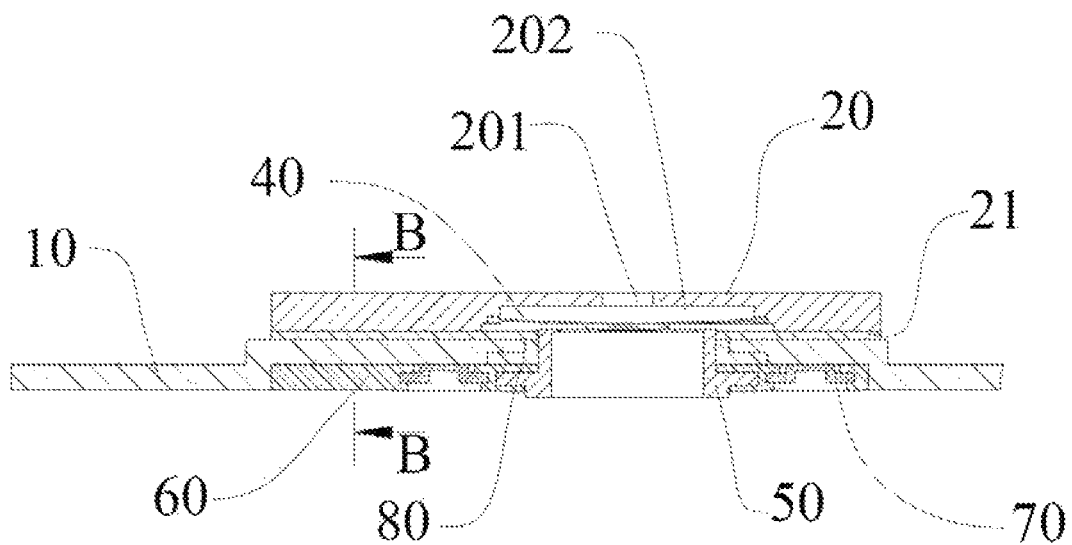
FIG. 4 is a partial view of an embodiment of the secondary battery provided in the present application.
Figure 5:
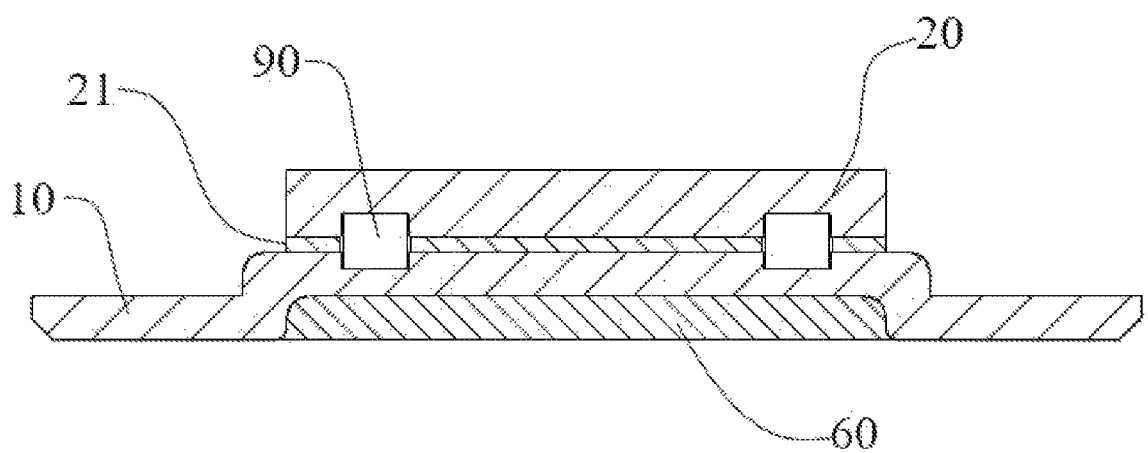
FIG. 5 is a sectional view along B-B line in FIG. 4.

Typically, the connecting plate 20 is provided on a side of the cap plate 10 away from the electrode component. The connecting plate 20 is not in direct contact with the cap plate 10. The first member 21 is provided between the connecting plate 20 and the cap plate 10. The first member 21 may be an insulating element or a conductive element. Since metal has a low resistance, generally the first member 21 is made of nonmetal material, such as conductive plastics, when serving as the conductive element. A recess 20 is opened in a surface of the connecting plate 20 close to the cap plate 10, so as to provide a turning space for the turnable plate 40. As shown in FIGS. 3-4, the recess 202, the turnable plate 40 and the first through hole are aligned with each other in sequence. The recess 202 is added to provide the turning space for the turnable plate 40, such that the connecting plate 20 may not impact the turning of the turnable plate 40 and the turning reliability of the turnable plate 40 can be guaranteed. Thus, when the pressure inside the secondary battery exceeds a reference pressure, the electrical connection between the first electrode plate and the turnable plate 40 can be cut off in time. Typically, in the turning direction of the turnable plate 40, a projection of the turnable plate 40 is within a projection of the recess 202.

The recess 202 is formed by recessing from the surface of the connecting plate 20 close to the cap plate 10 in the direction away from the cap plate 10. Along the turning direction of the turnable plate 40, the recess 202 may penetrate the connecting plate 20, or may be closed at the bottom away from the cap plate 10. In the latter case, when the pressure inside the secondary battery exceeds the reference pressure and pushes the turnable plate 40 to turn over, gas inside the recess 202 is squeezed resulting in an increased pressure, which can stop the turning of the turnable plate 40 and even cause an incomplete turning of the turnable plate 40, thus unable to ensure the disconnection between the first electrode plate and turnable plate 40. In order to solve this problem, the connecting plate 20 is provided with an exhaust vent 201 that penetrates the connecting plate 20 along the turning direction of the turnable plate 40 and is aligned with the turnable plate 40.

For convenience of connection, the first terminal component further includes a conductive plate 50. When the secondary battery is in a normal state, the turnable plate 40 is electrically connected to the first electrode plate through the conductive plate 50. When the pressure inside the secondary battery exceeds the reference pressure, the turnable plate 40 turns over to break off the conductive plate 50, thus cutting off the electrical connection between the connecting plate 20 and the first electrode plate.

In particular, as shown in FIG. 4, the conductive plate 50 is inserted into the first through hole to further increase the energy density of the secondary battery. The conductive plate 50 is not in direct contact with the cap plate 10. Optionally, a second member 60 is provided between the conductive plate 50 and the cap plate 10. The second member 60 may be an insulating element or a conductive element. Since metal has a low resistance, the second member 60 is generally made of non-metal material, such as conductive plastics, when serving as the conductive element.

Figure 8:
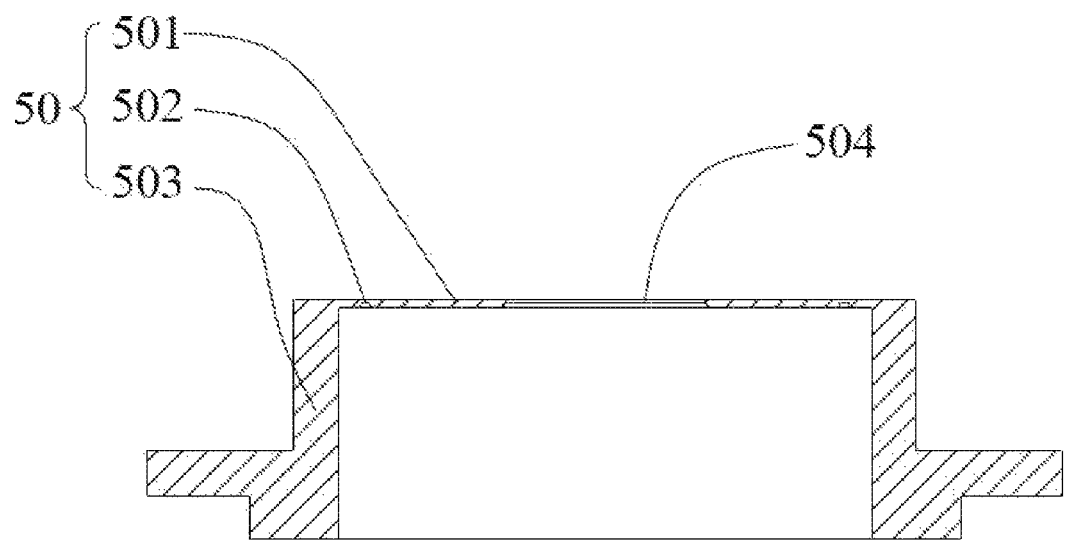
FIG. 8 is a structural schematic diagram for an embodiment of a conductive plate of the secondary battery provided in the present application.

A specific structure of the conductive plate 50, as shown in FIG. 8, includes a first conductive portion 501, a second conductive portion 503 and a thinning area 502. The thinning area 502 is located between the first conductive portion 501 and the second conductive portion 503, and its thickness is less than those of the first conductive portion 501 and the second conductive portion 503. The first conductive portion 501 is connected to the turnable plate 40, and the second conductive portion 503 is directly or indirectly connected to the first electrode plate. The conductive plate 50 is typically inserted into the first through hole via the second conductive portion 503. By providing the thinning area 502, connecting the first conductive portion 501 to the turnable plate 40 and connecting the second conductive portion 503 to the first electrode plate, the conductive plate 50 can be rapidly broken off at the thinning area 502 when the turnable plate 40 turns over, thus rapidly cutting off the electrical connection between the connecting plate 20 and the first electrode plate.

Figure 9:
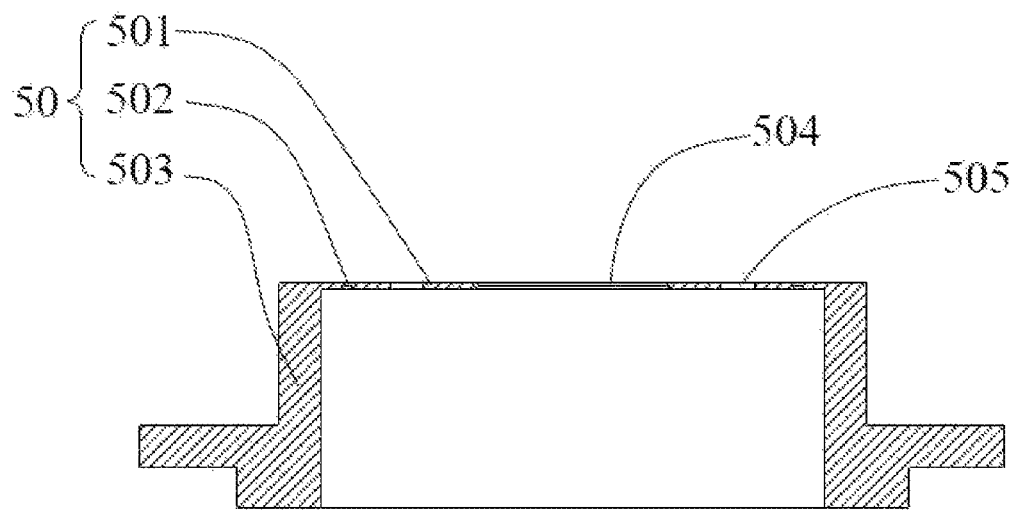
FIG. 9 is a structural schematic diagram for another embodiment of the conductive plate of the secondary battery provided in the present application.

Typically, the conductive plate 50 is provided with an air vent, which penetrates the conductive plate 50 in the turning direction of the turnable plate 40 and is aligned with the turnable plate 40. As shown in FIGS. 8-9, the conductive plate 50 may be provided with either a first air vent 504 or a second air vent 505, or both of them. Such structure enables the gas inside the secondary battery to flow to the turnable plate 40, and then turn over the turnable plate 40. In the case that a turnable portion 401 is provided, the second air vent 505 is aligned with the turnable portion 401 so as to ensure that gas will rapidly reach the turnable portion 401 when the gas is produced due to an internal short-circuit.

Further, the conductive plate 50 is recessed to form a cavity on a surface close to the electrode component. The first conductive portion 501 and the thinning area 502 are typically provided at the bottom of the cavity. As such, when the pressure inside the secondary battery exceeds the reference pressure, the conductive plate 50 is more easily to be broken off. In this case, the air vent is also provided at the bottom of the cavity.

In order to break the conductive plate 50 off with even a smaller tension, the thinning area 502 may be provided with either or both of an indentation and a break-off portion. In the case that the break-off portion is provided, the first conductive portion 501 and the second conductive portion 503 will be disconnected at the break-off portion.

Figure 6:
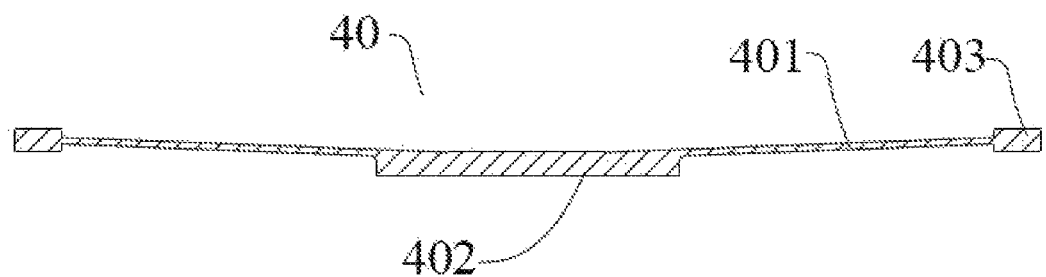
FIG. 6 is a structural schematic diagram for an embodiment of a turnable plate of the secondary battery provided in the present application.

The structure of the turnable plate 40, as shown in FIG. 6, includes the turnable portion 401 and a protrusion 402. The turnable portion 401 has a torus sheet structure, and its edge is connected to the connecting plate 20. The protrusion 402 is typically connected to the turnable portion 401 at a central area of the turnable portion 401, and protrudes toward the electrode component to be connected to the first electrode plate. In the case that the first conductive portion 501 is provided, the protrusion 402 is connected to the first conductive portion 501 and typically aligned with the first through hole. When the secondary battery is in the normal state, the connecting plate 20 is electrically connected to the first electrode plate through the turnable portion 401 and the protrusion 402. When the pressure inside the secondary battery exceeds the reference pressure, the turnable portion 401 turns over to cut off the electrical connection between the protrusion 402 and the first electrode plate. In the case that the first conductive portion 501, the thinning area 502, and the second conductive portion 503 are provided and the secondary battery is in the normal state, the connecting plate 20 is electrically connected to the first electrode plate through the turnable portion 401, the protrusion 402, the first conductive portion 501, the thinning area 502 and the second conductive portion 503. When the pressure inside the secondary battery exceeds the reference pressure, the turnable portion 401 turns over to disconnect the first conductive portion 501 from the second conductive portion 503, and thus cut off the electrical connection between the connecting plate 20 and the first electrode plate. With the protrusion 402 in the above structure, a distance between the turnable plate 40 and the first electrode plate can be reduced to ensure the electrical connection therebetween under the normal state.

Due to a flat structure of the first electrode plate or the first conductive portion 501, an end plane of the protrusion 402 has a flat structure as well to increase contact area between the turnable plate 40 and the first electrode plate or the first conductive portion 501 and thus ensure a reliable connection therebetween under the normal state.

Further, in order to ensure a reliable connection between the turnable plate 40 and the connecting plate 20, a connecting portion 403 is further provided at the edge of the turnable portion 401, and the thickness of the connecting portion 403 is larger than that of the turnable portion 401. The thickness refers to a size in the turning direction of the turnable plate 40. The turnable portion 401 is connected to the connecting plate 20 through the connection portion 403.

In the case that a recess is provided, the turnable portion 401 may be entirely located inside the recess, or may be connected to an opening of the recess. Preferably, the edge of turnable portion 401 is connected to an inner-wall of the recess to increase space utilization. Optionally, a first stepped surface is provided at the opening of the recess, as shown in FIG. 4, and the connecting portion 403 is fitted to the first stepped surface. In the case that only the turnable portion 401 is provided, the turnable portion 401 may also be fitted to the first stepped surface to avoid an unreliable connection between the turnable plate 40 and the first electrode plate caused by a loose connection between the turnable plate 40 and the connecting plate 20 under the normal state.

The resistance element 90 in the embodiments above may have either a columnar structure, or a sheet structure. In particular, the arrangement for the resistance element 90 may be as follows.

In a first arrangement, the resistance element 90 is provided between the cap plate 10 and the connecting plate 20. In this case, the connecting plate 20 is electrically connected to the cap plate 10 through the resistance element 90, rather than being directly connected to the cap plate 10. In the case that the first member 21 is provided, the resistance element 90 and the first member 21 may be formed as an integral structure by an integral molding process. In the case that the first member 21 is an insulating element, the resistance element 90 penetrates the first member 21 and its ends are connected to the cap plate 10 and the connecting plate 20 respectively. Generally, the resistance element 90 has a columnar structure in this case. Alternatively, in the case that the first member 21 is a conductive element, the first member 21 and the resistance element 90 are made of same material. In this case, the first member 21 can be regarded as the resistance element 90. The integral structure is preferably a sheet structure optionally made of conductive plastics. In other words, the resistance element 90 has a sheet structure, so that the connecting plate 20, the resistance element 90 and the cap plate 10 are stacked up to increase the reliability of connection.

In the case that the first member 21 is provided, the first member 21 is provided with a second through hole aligned with the first through hole. The projection of the turnable plate 40 is within the projection of the second through hole in the turning direction of the turnable plate 40, so as to prevent the first member 21 from interfering with the turning of the turnable plate 40.

Further, the connecting place 20 may be provided with a first groove, and the end of the resistance element 90 away from the cap plate 10 is inserted into the first groove. The cap plate 10 is provided with a second groove, and the end of the resistance element 90 close to the cap plate 10 is inserted into the second groove. By providing the first and second grooves, the shift between the resistance element 90 and the cap plate 10 or the connecting plate 20 can be avoided, which will increase the reliability of electrical connections among them. Alternatively, it may also be possible that only the connecting plate 20 is provided with the first groove, or only the cap plate 10 is provided with the second groove.

In the case that the secondary battery is provided with a conductive plate 50, the conductive plate 50 has no contact with the cap plate 10 or is insulated from the cap plate 10. As shown in FIG. 4, the insulation between the conductive plate 50 and the cap plate 10 may be realized by providing a second member 60, and in this case, the second member 60 is an insulating element.

In the case that the secondary battery is provided with the recess and the first stepped surface, in order to prevent the first member 21 from interfering with the turnable plate 40, a second stepped surface is provided at the opening of the recess. The second stepped surface is closer to the electrode component than the first stepped surface. In addition, for convenience of processing, the projection of the first stepped surface is within the projection of the second stepped surface in the turning direction of the turnable plate 40.

In a second arrangement, in the case that the secondary battery is provided with the conductive plate 50, the resistance element 90 is provided between the conductive plate 50 and the cap plate 10. In other words, the conductive plate 50 is electrically connected to the cap plate 10 through the resistance element 90. In the case that the secondary battery is provided with a second conductive portion 503, the second conductive portion 503 is electrically connected to the cap plate 10 through the resistance element 90. In other words, the connection plate 20 is electrically connected to the cap plate 10 through the turnable plate 40, the connective plate 50 (including the first conductive portion 501, the thinning area 502 and the second conductive portion 503 in the case that the second conductive portion 503 is provided) and the resistance element 90 in turn. In this manner, the connecting plate 20 is not in direct connection with the cap plate 10. Thus, the connecting plate 20 needs to be insulated from the cap plate 10, which may be realized by the first member 21 in the first arrangement. In this case, the first member 21 is an insulating element, or made of insulating plastics or insulating varnish.

Alternatively, the resistance element 90 has a columnar structure. When the conductive plate 50 is inserted into the first through hole, the resistance element 90 is provided between the inner wall of the first through hole and the conductive plate 50. The resistance element 90 may also be provided at the side of the cap plate 10 close to the electrode component. The second member 60 and the resistance element 90 may be formed as an integral structure by an integral molding process. If the second member 60 is an insulating element, then the resistance element 90 penetrates the second member 60 and its ends are connected to the conductive plate 50 and the cap plate 10 respectively. If the second member 60 is a conductive element, the second member 60 and the resistance element 90 may be made of same material such as conductive plastics. In this case, the second member 60 can be regarded as the resistance element 90.

In this case, in order to ensure the electrical connection between the conductive plate 50 and the first electrode plate, the conductive plate 50 (or the second conductive portion 503 if the second conductive portion 503 is provided) is provided with a protrusion protruding toward the first electrode plate. The protrusion is closer to the first electrode plate than the second member 60 in the turning direction of the turnable plate 40.

Figure 7:
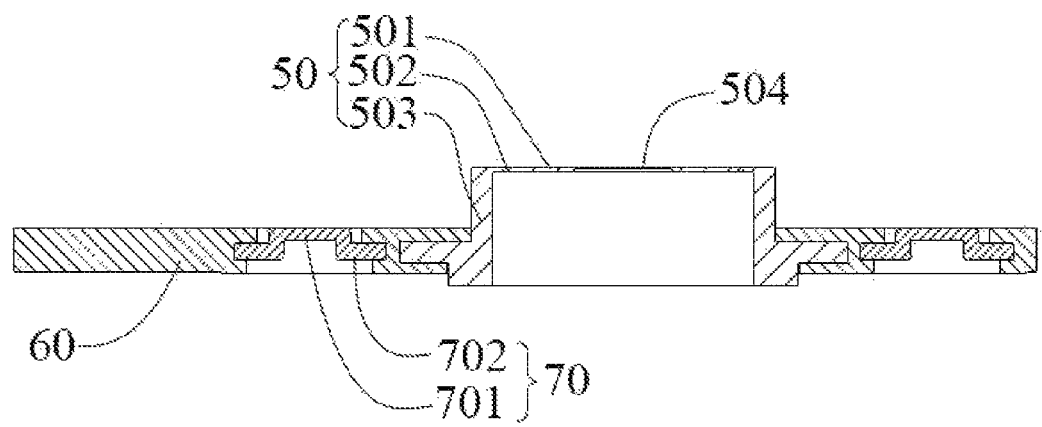
FIG. 7 is another partial view for an embodiment of the secondary battery provided in the present application.

Regardless of the arrangement, in the case that the second member is an insulating element, if the conductive plate 50 becomes loose to slide in the first through hole, the electrical connection between the connecting plate 20 an the first electrode plate cannot be cut off after the turable plate 40 turns over. The conductive plate 50 can be better fixed through the second member 60. The fixation between the conductive plate 50 and the second member 60 may be realized by locking connection, adhesives or screw fastening. For convenience of assembly, the locking connection is preferred. As shown in FIG. 7, the second member 60 and the conductive plate 50 may be integrally formed by injection molding, and the second member 60 is connected to the cap plate 10.

The fixation between second member 60 and the covering plate 10 may be realized by adhesives, locking connection, etc. The second member 60 is typically made of nonmetal material in the case of being an insulating element, and the cap plate 10 is made of metal material. Therefore, for ease of connection between the second member 60 and the cap plate 10, the secondary battery further includes a fixation element 70, which may be a rivet. As shown in FIG. 11, the rivet penetrates the connecting plate 20, the first member 21, the cap plate 10 and the second member 60 in turn. In order to ensure the seal between the rivet and the cap plate 10, a third sealing element 80 is provided between the cap plate 10 and an end of the rivet close to the electrode component. The fixation element 70 may have a structure as shown in FIG. 7. In such a structure, the second member 60 is provided with a fixation matching portion which matches the fixation element 70. The second member 60 is fixed to the cap plate 10 through the fixation element 70 by welding, riveting or screw fastening.

In particular, as shown in FIG. 7, the fixation element 70 includes a fixation portion 701 connected to the cap plate 10 and a locking portion 702 bending from the fixation portion 701 and extending to the direction away from the cap plate 10. The locking portion 702 is stuck into the fixation matching portion 701. The connection between the fixation element 70 and the second member 60 is realized by the locking connection structure for ease of assembly.

In order to facilitate the fixation of the fixation element 70 and the cap plate 10, the second member 60 is further provided with a third through hole, which penetrates the second member 60 along the direction from the cap plate 10 toward the second member 60 and is aligned with the fixation element 70.

There may be provided with one or two locking portions 702. In the case of two locking portions 702, the two locking portions 702 extend from the opposite ends of the fixation portion 701 and are stuck into the opposite sides of the fixation matching portion, respectively.

There may be provided with one or more sets of the fixation element 70 and the fixation matching portion, such as two, three or even more sets. Typically, there are two sets of the fixation elements 70 and the fixation matching portions, and the two sets are provided respectively on two sides of the first through hole relative to the axis of the first through hole.

In a second embodiment, the turnable plate 40 and the resistance element 90 are provided at different terminals. That is, the second terminal component is electrically connected to the cap plate 10 through the resistance element 90 and the first terminal component is electrically insulated from the cap plate 10. The connecting plate 20 may be electrically insulated from the cap plate 10 through the first member 21, and the conductive plate 50 may be electrically insulated from the cap plate 10 through the second member 60. In this case, both of the first member 21 and the second member 60 are insulating elements.

The foregoing descriptions are merely the preferable embodiments of the present application and are not intended to limit the present application. Various changes and modifications may be made by those skilled in the art. Any modifications, equivalent substitutions, improvements, and the like within the spirit and principles of the application are intended to be included within the claimed scope of the present application.

What is claimed is:

1. A secondary battery comprising a first terminal component, a second terminal component, a cap plate, an electrode component and a resistance element, wherein:
   the electrode component comprises a first electrode plate, a second electrode plate, and a separator between the first and second electrode plates;
   one of the first and second terminal components is electrically connected to the cap plate through the resistance element, while the other is electrically insulated from the cap plate;
   the first terminal component comprises a connecting plate and a turnable plate, wherein the turnable plate is attached to the connecting plate;
   when the secondary battery is in a normal state, the first electrode plate is electrically connected to the connecting plate through the turnable plate, and the second electrode plate is electrically connected to the second terminal component; and
   when a pressure inside the secondary battery exceeds a reference pressure, the turnable plate turns over to cut off an electrical connection between the turnable plate and the first electrode plate,
   wherein the first terminal component is electrically connected to the cap plate through the resistance element, and the second terminal component is electrically insulated from the cap plate; the connecting plate is provided on a side of the cap plate away from the electrode component, and the cap plate is provided with a first through hole; and the connecting plate is provided with a recess on a surface of the connecting plate facing the cap plate, wherein the recess provides turning space for the turnable plate, and the recess, the turnable plate and the first through hole are aligned with each other in turn.

2. The secondary battery of claim 1, wherein the first terminal component further comprises a conductive plate;
   when the secondary battery is in the normal state, the turnable plate is electrically connected to the first electrode plate through the conductive plate; and
   when the pressure inside the secondary battery exceeds the reference pressure, the turnable plate turns over to break off the conductive plate and thus cut off an electrical connection between the connecting plate and the first electrode plate.

3. The secondary battery of claim 2, wherein the conductive plate is inserted into the first through hole.

4. The secondary battery of claim 3, wherein the conductive plate comprises a first conductive portion, a second conductive portion and a thinning area,
   the thinning area is provided between the first conductive portion and the second conductive portion and has a thickness less than those of the first conductive portion and the second conductive portion; and
   the first conductive portion is connected to the turnable plate, and the second conductive portion is inserted into the first through hole and electrically connected to the first electrode plate.

5. The secondary battery of claim 4, wherein the turnable plate comprises a turnable portion and a protrusion,
   the turnable portion has a torus sheet structure with an edge connected to the connecting plate; and
   the protrusion is connected to the turnable portion, protrudes toward the electrode component, and is connected to the first conductive portion;
   when the secondary battery is in the normal state, the connecting plate is electrically connected to the first electrode plate through the turnable portion, the protrusion, the first conductive portion, the thinning area, and the second conductive portion in turn;
   when the pressure inside the secondary battery exceeds the reference pressure, the turnable portion turns over to disconnect the first conductive portion from the second conductive portion, and thus cut off the electrical connection between the connecting plate and the first electrode plate.

6. The secondary battery of claim 4, wherein a first member is further provided as an insulating element between the connecting plate and the cap plate, and the second conductive portion is electrically connected to the cap plate through the resistance element.

7. The secondary battery of claim 6, further comprising a second member, wherein the conductive plate is fixed to the cap plate through the second member, and the resistance element and the second member are formed as an integral structure.

8. The secondary battery of claim 4, wherein the resistance element is provided between the connecting plate and the cap plate, and the connecting plate is electrically connected to the cap plate through the resistance element.

9. The secondary battery of claim 8, further comprising a second member, which is provided as an insulating element between the second conductive portion and the first through hole.

10. The secondary battery of claim 8, further comprising a first member provided between the connecting plate and the cap plate, wherein the resistance element and the first member are formed as an integral structure; and the connecting plate, the resistance element and the cap plate are stacked up.

11. The secondary battery of claim 1, wherein a resistance of the resistance element is in a range of 1-100000 ohm.

* * * * *